UNITED STATES PATENT OFFICE.

ALFRED FRYER, OF MANCHESTER, ENGLAND.

IMPROVEMENT IN PROCESSES OF PRESERVING ANIMAL AND VEGETABLE SUBSTANCES.

Specification forming part of Letters Patent No. 132,002, dated October 8, 1872.

*To all whom it may concern:*

Be it known that I, ALFRED FRYER, of Manchester, England, have invented a certain Improved Process for Preserving Animal Substances for Food, of which the following is a specification:

Nature and Objects of the Invention.

My invention consists in, first, simply hermetically inclosing the animal substances in cases or receptacles of any suitable kind; and in, secondly, subjecting them, while thus hermetically inclosed, to a high temperature, under conditions such that the internal pressure due to the heat being balanced by external pressure, will not injure the cases nor impair their air-tightness. The object of my invention is to preserve the animal substances for food or to put them into a condition such that they may be kept in the cases for a considerable length of time with the least possible modification of their consistency or flavor.

Description of the Process.

I put the animal substances into the cases without the addition of any foreign or so-called preservative agent which might injuriously affect their taste or wholesomeness. The cases are then hermetically closed and heated. A temperature equal to about 275° Fahrenheit is, in practice, found to be the best, and an exposure to that temperature during about one hour is found sufficient for cases containing each about four pounds of meat; but I do not restrict myself to the said precise temperature or duration of its application, as in some cases a temperature as low as 240° Fahrenheit, with a corresponding inverse change or increase in the duration of its application may be adopted. The heat may be conveniently applied by placing a number of the closed cases within a suitable vessel or boiler, which is then closed, and steam, heated water, heated air, or other suitable heated fluid is admitted into the outer or inclosing vessel, and a pressure maintained therein to counterbalance the internal pressure in the cases. On the completion of the heating process the cases are gradually cooled, and the pressure outside of them gradually diminished, after which the cases are ready for packing or storing without further treatment of any kind. It is an important distinguishing feature of the improved process that the cases are not open either during or after the application of the heat, so that no air, gas, or other vapor is introduced into or withdrawn from them after they are closed.

It has been attempted to preserve various substances to be used as food by subjecting them, in closed cases or vessels, to a temperature of 212° Fahrenheit, but without any precautions to resist the action of internal pressure. It has, however, been proved by experiments made in connection with the present invention that butcher-meat or other animal substance cannot be effectively preserved if heated only to 212° Fahrenheit; or if some degree of preservative action is obtainable by that heat, it is only on subjecting the meat or other substance to it for five or more hours, which excessive duration of the treatment always results in greatly injuring the flavor of the meat. By the improved process, on the other hand, the meat or other animal substance is effectively preserved in a comparatively short time, and with its flavor modified in the least possible degree.

Claim.

The preserving of animal substances by subjecting them in hermetically closed cases or vessels to a temperature of at least 240° Fahrenheit, a corresponding pressure being applied externally during the process, substantially as hereinbefore described.

ALFRED FRYER.

Witnesses:
NAPIER SMITH,
EDMUND HUNT.